Oct. 27, 1959  J. O. ALMEN  2,910,141
MEANS FOR COOLING TRANSMISSION ROLLERS
Filed Aug. 29, 1958
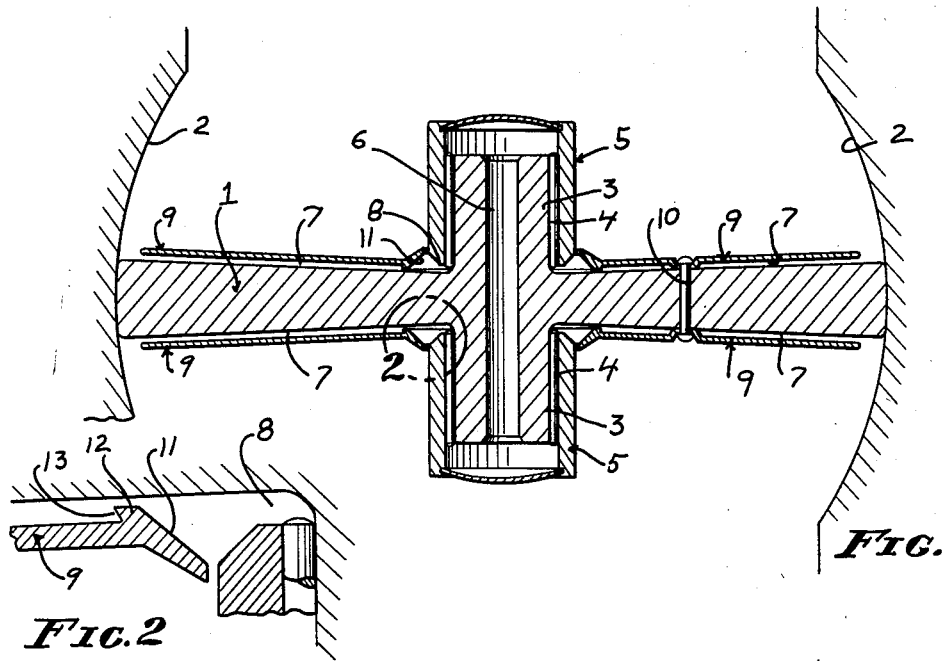
Fig. 1
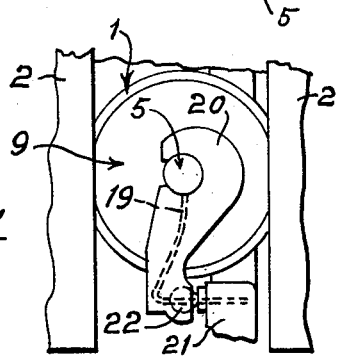
Fig. 2
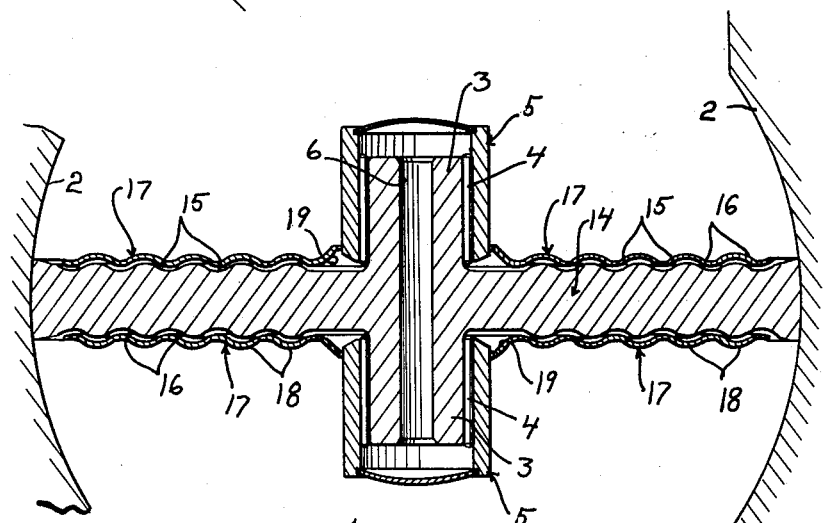
Fig. 3
Fig. 4
INVENTOR.
JOHN O. ALMEN
BY Lyon & Lyon
ATTORNEYS

United States Patent Office 2,910,141
Patented Oct. 27, 1959

2,910,141

MEANS FOR COOLING TRANSMISSION ROLLERS

John O. Almen, Sierra Madre, Calif.

Application August 29, 1958, Serial No. 758,053

6 Claims. (Cl. 184—6)

This invention relates to means for cooling transmission rollers, more particularly to a cooling means which is adapted to the type of transmission disclosed in my prior Patent No. 2,131,159 issued September 27, 1938, entitled "Cooling Transmission Rollers."

The primary object of this invention is to provide a means wherein efficient heat exchange between a coolant lubricant and the transmission rollers is accomplished by controlled radial flow of the coolant lubricant radially over the side surfaces of the rollers.

With the above and other objects in view, as may appear hereinafter, reference is directed to the accompanying drawings in which:

Figure 1 is a transverse sectional view of a transmission roller showing its mounting yoke and confronting race members fragmentarily;

Figure 2 is an enlarged, fragmentary, sectional view of the encircled area designated 2 in Figure 1;

Figure 3 is a sectional view similar to Figure 1 showing a modified construction of the transmission roller.

Figure 4 is a reduced fragmentary view of a transmission of the type shown more fully in Patent No. 2,131,-159, indicating the manner in which lubricant is supplied to the transmission roller.

The present invention is an improvement of the invention disclosed in Patent No. 2,131,159 issued September 27, 1938, entitled "Cooling Transmission Rollers." The present invention has to do with the construction of the transmission roller per se, and reference is made to the above-identified patent as illustrative of the other elements of the transmission associated with the transmission roller.

Reference is first directed to Figures 1 and 2. In the construction here illustrated, each transmission roller 1 of a set of transmission rollers is in the form of a disk having a relatively large diameter as compared to its axial length. The periphery of each roller is essentially a zone of a sphere for engagement with diametrically disposed, concave, toroidal raceways 2.

Each roller 1 is provided with a pair of oppositely directed stub axles 3 which fit within needle bearings 4 disposed within housings 5 forming the extremities of suitable yokes, not shown, but more fully disclosed in the above-identified patent. Passage means, not shown, supply lubricant to the housings 5. The stub axles may be provided with a common bore 6 extending between the housings 5 so that lubricant may be equally distributed between the housings.

The axially adjacent ends of the housings 5 form with the confronting axial faces 7 of the roller 1, adjacent the root ends of the stub axles 3, a pair of annular channels 8 through which lubricant may flow so as to discharge against the axial faces of the roller. The axial faces 7 of the roller 1 diverge from the axles 3 to the periphery of the roller and thus define conical sections.

Each axial face 7 of the roller 1 is covered by a shroud plate 9. The pair of shroud plates 9 diverge radially outward in uniformly spaced relation with the axial faces 7. At suitable intervals the shroud plates 9 are secured to the roller 1 by rivets 10.

The radially inner extremity of each shroud plate 9 forms an axially, outwardly beveled, entrance face 11 overlying the corresponding needle bearing housing 5, so that lubricant flowing therefrom is directed into the spaces between the shroud plates and the axial faces 7. At the juncture of each beveled face 11 with the main portion of the shroud plate 9 there is formed an annular lip 12 having an undercut margin 13.

Operation of the transmission roller shown in Figures 1 and 2 is as follows:

A coolant lubricant is forced by any suitable means, such as shown in the aforementioned patent, into and through the needle bearings 4 so as to discharge from the annular channels 8. The lubricant is directed between the entrance faces 11 and the axial faces 7 of the roller and is deflected to the surfaces of the roller.

The lubricant, by reason of the fact that the axial faces 7 diverge, tends to flow on these surfaces rather than the confronting surfaces of the shroud plates 9. The annular lip 12 with its undercut margin 13 aids in directing the lubricant exclusively to the axial faces 7. During the radial flow of the lubricant, by reason of the centrifugal force generated by the rotation of the roller 1, the lubricant is maintained in excellent heat transfer relative with the roller 1 so as to absorb heat therefrom.

The lubricant, on reaching the periphery of the roller 1, clears the shroud plates 9 and a portion is thrown against the raceways 2, whereupon centrifugal force generated by rotation of the raceways discharges excess lubricant therefrom to the walls of a surrounding casing, not shown.

Reference is directed to the construction shown in Figure 3. In this construction a roller 14 is provided at its axial faces with annular corrugations. These corrugations form, in effect, a series of annular, radially outwardly diverging areas 15 separated by radially outwardly converging areas 16. The axial faces are covered by shroud plates 17 having corrugations 18 matching the corrugations of the roller 14 so that the shroud plates are uniformly spaced from the axial surfaces of the roller.

As in the first described structure, the shroud plates 17 are provided with beveled entrance faces 19. The roller 14 is provided with stub axles 3 in the manner of the first described structure, which are supported in needle bearings 4 contained in housings 5.

The lubricant, in flowing radially, by reason of the rotation of the roller 14 impinges against the radially outwardly diverging areas 15, then engages the portions of the corrugations 14 opposite the converging areas 16, and is again directed against the next converging areas 16. The lubricant is thus maintained in efficient heat transfer relation with the axial surfaces of the roller 14 until discharged from the periphery thereof.

As more fully disclosed in Patent No. 2,131,159, lubricant is supplied to housings 5 of either embodiment illustrated through passages 19 contained in yoke structures 20 which journal the rollers. The yoke structures 20 are connected to a frame 21, indicated fragmentarily, through ball and socket joints 22 having lubricant passages therethrough. The frame 21 is mounted on a frame tube which in turn is mounted on a shaft which forms therewith an annular lubricant channel. The frame tube and shaft are not here shown, but are fully disclosed in the aforementioned Patent 2,131,159.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A transmission, comprising: opposed toroidal raceways; transmission rollers interposed between said raceways, said rollers having central axles; means for journaling said rollers by their axles and supplying coolant lubricant thereto for radially outward flow over the axial ends of said rollers; the axial ends of said rollers defining radially outwardly diverging surfaces tending to deflect said coolant lubricant axially during radially outward flow, thereby to maintain said coolant lubricant in heat-absorbing relation with said axial surfaces.

2. A transmission as set forth in claim 1, wherein: said radially outwardly diverging axial surfaces define conical sections.

3. A transmission as set forth in claim 1, wherein: said radially outwardly diverging axial surfaces are formed by a plurality of annular corrugations, said surfaces being separated by radially outwardly converging surfaces; and deflection means spaced from said surfaces redirecting said lubricant between said radially outwardly diverging surfaces.

4. A transmission, comprising: opposed toroidal raceways; transmission rollers interposed between said raceways, said rollers having central axles; means for journaling said rollers by their axles and supplying coolant lubricant thereto for radially outward flow over the axial ends of said rollers; the axial ends of said rollers defining radially outwardly diverging surfaces tending to deflect said coolant lubricant axially during radially outward flow, thereby to maintain said coolant lubricant in heat-absorbing relation with said axial surfaces; and shroud plates overlying said surfaces and spaced therefrom.

5. A transmission as set forth in claim 4, wherein: said radially outwardly diverging axial surfaces define conical sections, said shroud plates are disposed in substantially uniformly spaced relation therewith and an undercut annular lip is provided at the radially inner portion of each shroud plate whereby flow of lubricant on the surfaces of the shroud plates is minimized.

6. A transmission as set forth in claim 4, wherein: said radially outwardly diverging axial surfaces are formed by a plurality of annular corrugations, said surfaces being separated by radially outwardly converging surfaces; and said shroud plates are correspondingly corrugated thereby to form deflection surfaces opposite the outwardly converging surfaces of said rollers to redirect said lubricant onto said radial outwardly diverging surfaces.

References Cited in the file of this patent

UNITED STATES PATENTS

| | | |
|---|---|---|
| 2,131,159 | Almen | Sept. 27, 1938 |
| 2,517,913 | Nickle | Aug. 8, 1950 |